(12) United States Patent
Salmikuukka et al.

(10) Patent No.: US 9,873,590 B2
(45) Date of Patent: Jan. 23, 2018

(54) APPARATUS AND A METHOD FOR ELEVATOR ALLOCATION USING A MAGNETIC FIELD MAP IN AN ELEVATOR SYSTEM

(71) Applicant: KONE CORPORATION, Helsinki (FI)

(72) Inventors: Jukka Salmikuukka, Espoo (FI); Ari Virtanen, Espoo (FI); Kenneth Kronkvist, Vantaa (FI)

(73) Assignee: Kone Corporation, Helsinki (FI)

( * ) Notice: Subject to any disclaimer, the term of this patent is extended or adjusted under 35 U.S.C. 154(b) by 363 days.

(21) Appl. No.: 14/805,261

(22) Filed: Jul. 21, 2015

(65) Prior Publication Data

US 2015/0321881 A1    Nov. 12, 2015

Related U.S. Application Data

(63) Continuation of application No. PCT/FI2013/050111, filed on Feb. 1, 2013.

(51) Int. Cl.
*B66B 1/34* (2006.01)
*B66B 1/46* (2006.01)
(Continued)

(52) U.S. Cl.
CPC ............... *B66B 1/46* (2013.01); *B66B 3/00* (2013.01); *B66B 3/006* (2013.01); *G01C 21/206* (2013.01);
(Continued)

(58) Field of Classification Search
CPC .. B66B 1/46; B66B 3/00; B66B 3/006; B66B 2201/232; B66B 2201/4653; G01C 21/206
(Continued)

(56) References Cited

U.S. PATENT DOCUMENTS 4,685,538 A * 8/1987 Kamaike ................. B66B 1/468
                                                                  187/380
7,505,849 B2 * 3/2009 Saarikivi ................ G01C 21/00
                                                                  342/451

(Continued)

FOREIGN PATENT DOCUMENTS

EP           2 148 167 A2    1/2010
WO    WO 2007/020907 A1    2/2007

*Primary Examiner* — Anthony Salata
(74) *Attorney, Agent, or Firm* — Birch, Stewart, Kolasch & Birch, LLP

(57) ABSTRACT

The invention relates to a method and apparatus. In the method a target area is divided to a plurality of cells. A plurality of movement paths of mobile nodes are determined, each movement path comprising an origin cell and a target cell, the origin cell and the target cell being determined using a magnetic map of the target area. The durations of the plurality of movement paths are determined for an elevator user. A route topology data structure is formed using the plurality of movement paths and the durations of the plurality of movement paths, the data structure comprising for a plurality of cells an estimated time to reach an elevator location. An elevator call in a request cell is determined by a requesting mobile node. The time to reach the elevator location is determined using the data structure and information on the request cell, and an elevator car is selected to serve the elevator call based on the time to reach the elevator location, current positions of at least two elevator cars, and current directions of at the least two elevator cars.

22 Claims, 6 Drawing Sheets

(51) Int. Cl.
*B66B 3/00* (2006.01)
*G01C 21/20* (2006.01)

(52) U.S. Cl.
CPC . *B66B 2201/232* (2013.01); *B66B 2201/4653* (2013.01)

(58) Field of Classification Search
USPC ............... 187/247, 380–388, 394, 392, 396; 455/456.1; 701/433, 434, 467–471, 532, 701/533
See application file for complete search history.

(56) References Cited

U.S. PATENT DOCUMENTS

| | | | | |
|---|---|---|---|---|
| 7,712,586 | B2* | 5/2010 | Legez | B66B 1/20 187/387 |
| 9,323,232 | B2* | 4/2016 | Blom | G05B 13/00 |
| 9,580,272 | B2* | 2/2017 | Kappeler | B66B 1/468 |
| 2004/0010368 | A1* | 1/2004 | Scott | G01S 19/05 701/469 |
| 2006/0135183 | A1* | 6/2006 | Zavada | H04W 64/00 455/457 |
| 2009/0303036 | A1* | 12/2009 | Sahuguet | G06F 17/30047 340/539.13 |
| 2010/0023250 | A1* | 1/2010 | Mays | G09B 29/106 701/533 |
| 2012/0143495 | A1* | 6/2012 | Dantu | G01C 21/206 701/428 |
| 2015/0204678 | A1* | 7/2015 | Schuster | B66B 1/468 701/522 |
| 2015/0251874 | A1* | 9/2015 | Salmikuukka | B66B 1/468 187/380 |
| 2015/0291388 | A1* | 10/2015 | Hovi | B66B 1/468 187/387 |

* cited by examiner

APPARATUS AND A METHOD FOR ELEVATOR ALLOCATION USING A MAGNETIC FIELD MAP IN AN ELEVATOR SYSTEM

CROSS REFERENCE TO RELATED APPLICATIONS

This application is a Continuation of PCT International Application No. PCT/FI2013/050111 filed on Feb. 1, 2013, which is hereby expressly incorporated by reference into the present application.

BACKGROUND OF THE INVENTION

Field of the Invention

The invention relates to elevators, elevator allocation for a user, and an apparatus and a method for elevator allocation using a magnetic field map in an elevator system.

Description of the Related Art

Even in buildings with less than ten floors, the correct allocation of elevator cages, that is, elevator cars to serve elevator calls from different floors is essential for quick response time and reduced time spent in travelling in the elevator. The time spent in the elevator is dependent on the number of intermediate floors visited and the time the elevator cage doors are kept open. The problem is exacerbated in high rise buildings even though in high rise buildings the floors are usually serviced by short-distance and long-distance elevators so that only specific floors are accessible by the long-distance elevators. As is well known, elevator calls may be made from floors and from the elevator cages. An elevator call may be understood as a command for the elevator cage to visit a specific floor. In modern elevator systems a user of the elevator may specify for the elevator the destination floor when making the elevator call from a floor, that is, outside the elevator cage. Herein the term elevator may be used to refer to the elevator cage for simplicity. For improved elevator response time, it must be possible to minimize the time elevator cage door are kept open. Naturally, closing the doors when there are still incoming passengers and there is still room in the elevator cage is perceived as annoying. In present elevator systems the elevator users must come to a specific place where an elevator call keypad is located to make the elevator call. In many cases the keypad is directly in front of the elevators, but it may be also located some distance from the elevators.

In order to improve the service offered by an elevator system, it would be beneficial to be able to predict when an elevator user arrives at the elevators. It would also be beneficial to be able to determine the destination floor of the elevator user. In this way it would be possible to ensure that elevator doors are not kept open too long.

SUMMARY OF THE INVENTION

According to an aspect of the invention, the invention is a method, comprising: dividing a target area to grid having a predefined resolution, the grid comprising a plurality of cells; determining a plurality of movement paths of a plurality of mobile nodes, each movement path comprising an origin cell and a target cell, the origin cell and the target cell being determined using a magnetic map of the target area; determining the durations of the plurality of movement paths for an elevator user; forming a route topology data structure using the plurality of movement paths and the durations of the plurality of movement paths, the route topology data structure comprising for a plurality of cells a time to reach an elevator location cell; determining an elevator call in a request cell by a requesting mobile node, the request cell being the cell in which the elevator call is made; determining the time to reach the elevator location cell using the route topology data structure and information on the request cell; and selecting an elevator car to serve the elevator call based on the time to reach the elevator location cell, a floor of the elevator location cell, current positions of at least two elevator cars, and current directions of at the least two elevator cars.

According to an aspect of the invention, the invention is a method, comprising: dividing a target area to grid having a predefined resolution, the grid comprising a plurality of cells by a mobile node; determining a first cell by the mobile node using a magnetic map in the mobile node; determining a second cell by the mobile node using the magnetic map in the mobile node; determining the time elapsed to move between the first cell and the second cell; transmitting information on the first cell, the second cell and the time elapsed to a route network node; receiving a route topology data structure by the mobile node from the route network node, the route topology data structure comprising for a plurality of cells a time to reach an elevator location cell; determining an elevator call by the mobile node; determining a request cell in which the elevator call is made using the magnetic map in the mobile node; determining the time to reach the elevator location cell using the route topology data structure and information on the request cell; and transmitting the time to reach the elevator location cell to an elevator control network node.

According to a further aspect of the invention, the invention is an apparatus comprising at least one processor and at least one memory including computer program code, the at least one memory and the computer program code configured to, with the at least one processor, cause the apparatus at least to perform: dividing a target area to grid having a predefined resolution, the grid comprising a plurality of cells; receiving information on a plurality of movement paths of a plurality of mobile nodes, each movement path comprising an origin cell and a target cell, the origin cell and the target cell being determined using a magnetic map of the target area; determining the durations of the plurality of movement paths; forming a route topology data structure using the plurality of movement paths and the durations of the plurality of movement paths, the route topology data structure comprising for a plurality of cells a time to reach an elevator location cell; receiving information on an elevator call in a request cell by a requesting mobile node, the request cell being the cell in which the elevator call is made; determining the time to reach the elevator location cell using the route topology data structure and the request cell; and selecting an elevator car to serve the elevator call based on the time to reach the elevator location cell, a floor of the elevator location cell, current positions of at least two elevator cars, and current directions of at the least two elevator cars.

According to a further aspect of the invention, the invention is an elevator control computer comprising the apparatus.

According to a further aspect of the invention, the invention is an apparatus comprising at least one processor and at least one memory including computer program code, the at least one memory and the computer program code configured to, with the at least one processor, cause the apparatus at least to perform: dividing a target area to grid having a predefined resolution, the grid comprising a plurality of cells; receiving information on a plurality of movement paths of a plurality of mobile nodes, each movement path comprising an origin cell and a target cell, the origin cell and the target cell being determined using a magnetic map of the target area; determining the durations of the plurality of movement paths; forming a route topology data structure using the plurality of movement paths and the durations of the plurality of movement paths, the route topology data structure comprising for a plurality of cells a time to reach an elevator location cell; receiving information on an elevator call in a request cell by a requesting mobile node, the request cell being the cell in which the elevator call is made; determining the time to reach the elevator location cell using the route topology data structure and the request cell; and selecting an elevator car to serve the elevator call based on the time to reach the elevator location cell, a floor of the elevator location cell, current positions of at least two elevator cars, and current directions of at the least two elevator cars.

According to a further aspect of the invention, the invention is a mobile node comprising the apparatus.

According to a further aspect of the invention, the invention is an apparatus comprising: means for dividing a target area to grid having a predefined resolution, the grid comprising a plurality of cells; means for determining a plurality of movement paths of a plurality of mobile nodes, each movement path comprising an origin cell and a target cell, the origin cell and the target cell being determined using a magnetic map of the target area; means for determining the durations of the plurality of movement paths for an elevator user; means for forming a route topology data structure using the plurality of movement paths and the durations of the plurality of movement paths, the route topology data structure comprising for a plurality of cells a time to reach an elevator location cell; means for determining an elevator call in a request cell by a requesting mobile node, the request cell being the cell in which the elevator call is made; means for determining the time to reach the elevator location cell using the route topology data structure and information on the request cell; and means for selecting an elevator car to serve the elevator call based on the time to reach the elevator location cell, a floor of the elevator location cell, current positions of at least two elevator cars, and current directions of at the least two elevator cars.

According to a further aspect of the invention, the invention is an apparatus comprising: means for dividing a target area to grid having a predefined resolution, the grid comprising a plurality of cells by a mobile node; means for determining a first cell by the mobile node using a magnetic map in the mobile node; determining a second cell by the mobile node using the magnetic map in the mobile node; means for determining the time elapsed to move between the first cell and the second cell; means for transmitting information on the first cell, the second cell and the time elapsed to a route network node; means for receiving a route topology data structure by the mobile node from the route network node, the route topology data structure comprising for a plurality of cells a time to reach an elevator location cell; means for determining an elevator call by the mobile node; means for determining a request cell in which the elevator call is made using the magnetic map in the mobile node; means for determining the time to reach the elevator location cell using the route topology data structure and information on the request cell; and means for transmitting the time to reach the elevator location cell to an elevator control network node.

According to a further aspect of the invention, the invention is a computer program comprising code adapted to cause the following when executed on a data-processing system: dividing a target area to grid having a predefined resolution, the grid comprising a plurality of cells; determining a plurality of movement paths of a plurality of mobile nodes, each movement path comprising an origin cell and a target cell, the origin cell and the target cell being determined using a magnetic map of the target area; determining the durations of the plurality of movement paths for an elevator user; forming a route topology data structure using the plurality of movement paths and the durations of the plurality of movement paths, the route topology data structure comprising for a plurality of cells a time to reach an elevator location cell; determining an elevator call in a request cell by a requesting mobile node, the request cell being the cell in which the elevator call is made; determining the time to reach the elevator location cell using the route topology data structure and information on the request cell; and selecting an elevator car to serve the elevator call based on the time to reach the elevator location cell, a floor of the elevator location cell, current positions of at least two elevator cars, and current directions of at the least two elevator cars.

According to a further aspect of the invention, the invention is a computer program comprising code adapted to cause the following when executed on a data-processing system: dividing a target area to grid having a predefined resolution, the grid comprising a plurality of cells by a mobile node; determining a first cell by the mobile node using a magnetic map in the mobile node; determining a second cell by the mobile node using the magnetic map in the mobile node; determining the time elapsed to move between the first cell and the second cell; transmitting information on the first cell, the second cell and the time elapsed to a route network node; receiving a route topology data structure by the mobile node from the route network node, the route topology data structure comprising for a plurality of cells a time to reach an elevator location cell; determining an elevator call by the mobile node; determining a request cell in which the elevator call is made using the magnetic map in the mobile node; determining the time to reach the elevator location cell using the route topology data structure and information on the request cell; and transmitting the time to reach the elevator location cell to an elevator control network node.

According to a further aspect of the invention, the invention is a computer program product comprising the computer program.

According to an aspect of the invention, the invention is a method comprising, a computer program comprising, or an apparatus comprising means for: dividing a target area to a plurality of cells; determining a plurality of movement paths of a plurality of mobile nodes, each movement path comprising an origin cell and a target cell, the origin cell and the target cell being determined using a magnetic map of the target area; determining the durations of the plurality of movement paths for an elevator user; forming a route topology data structure using the plurality of movement paths and the durations of the plurality of movement paths, the route topology data structure comprising for a plurality of cells a time to reach an elevator location; determining an elevator call in a request cell where the elevator call is made by a requesting mobile node; determining the time to reach the elevator location using the route topology data structure and information on the request cell; and selecting an elevator car to serve the elevator call based on the time to reach the elevator location, a floor of the elevator location, current positions of at least two elevator cars, and current directions of at the least two elevator cars.

According to an aspect of the invention, the invention is a method comprising, a computer program comprising, or an apparatus comprising means for: dividing a target area to a plurality of cells; determining a plurality of movement paths of a plurality of mobile nodes, each movement path comprising an origin cell and a target cell, the origin cell and the target cell being determined using a magnetic map of the target area; determining the durations of the plurality of movement paths for an elevator user; determining an elevator call in a request cell where the elevator call is made by a requesting mobile node; determining the time to reach the elevator location using information on the request cell; and selecting an elevator car to serve the elevator call based on the time to reach the elevator location, a floor of the elevator location, current positions of at least two elevator cars, and current directions of at the least two elevator cars.

In one embodiment of the invention, the elevator car may also be referred to as elevator cage. The elevator car may be elevator cage.

In one embodiment of the invention, the time to reach an elevator location cell is an estimate of the time to reach an elevator location cell.

In one embodiment of the invention, the target area is a floor of a building. The floor may be above or below ground level. The grid cells may be squares of predefined size in the floor. The duration of a movement path is the time required to walk or otherwise travel the path. The target area may comprise a plurality of floors or levels. The floors or levels may share the elevator location cell on one of the floors or location cells.

In one embodiment of the invention, the route topology data structure comprises information on a plurality of paths on the floor. At least one path leads to an area or a plurality of areas in front of the at least two elevator cars on the floor. An area in front of the at least two elevator cars is the elevator location cell. The route topology data structure also comprises information on specific points on the path how it takes to reach the elevator location cell.

In one embodiment of the invention, the request cell is the cell in which the elevator call is made.

In one embodiment of the invention, the method further comprises measuring a magnetic map of a target area using a magnetometer; and storing the magnetic map to a memory.

In one embodiment of the invention, the step of storing the magnetic map to a memory comprises transmitting a plurality of magnetic map measurements of the target area to a magnetic map network server; and storing the magnetic map to a memory within the magnetic map network server.

In one embodiment of the invention, the method further comprises determining the actual time required for the requesting mobile node to reach the elevator location cell; and updating the data related to at least the request cell in the route topology data structure using the actual time.

In one embodiment of the invention, the method further comprises associating a mobile node identifier for each of the plurality of movement paths; determining a speed category for each mobile node; and storing in the route topology data structure a time to reach an elevator location cell for each speed category.

In one embodiment of the invention, the step of determining the time to reach the elevator location cell further comprises determining the speed category of the mobile node.

In one embodiment of the invention, the elevator call comprises information on the target floor and the selecting of the elevator car to serve the elevator call uses the target floor as a further criterion. The target floor is to be understood as the destination of the elevator ride for the user, the mobile node of which detects or makes the elevator call.

In one embodiment of the invention, the method further comprises transmitting information on the magnetic map to the plurality of mobile nodes.

In one embodiment of the invention, wherein the step of forming the route topology data structure comprises receiving information on the plurality of movement paths and movement path durations from the plurality of mobile node to a route network server; and forming the route topology data structure in the route network server.

In one embodiment of the invention, the method further comprises receiving the elevator call from the requesting mobile node by the route network server, the route network server determining the time to reach the elevator location cell using the route topology data structure and the request cell and the route network server selecting the elevator car to serve the elevator call.

In one embodiment of the invention, the method further comprises transmitting a request to a controller associated with the selected elevator car, the request indicating the floor the elevator call was made in.

In one embodiment of the invention, the method further comprises indicating the selected elevator car to the user of the mobile node.

In one embodiment of the invention, the selected elevator car is indicated to the user of the mobile node using a display of the mobile node.

In one embodiment of the invention, the selected elevator car is indicated to the user of the mobile node using an external display within a predefined proximity from the mobile node.

In one embodiment of the invention, in the selection of the elevator car to serve the elevator call is used the time to reach a door of the elevator car from the elevator location cell. There may be multiple elevator location cells within a floor. The elevator location cells may be located in front of, for example, a row or other spatial arrangement of the elevator shafts. The nearest elevator location cell to the request cell where the elevator call may be made may be selected as the elevator location cell.

In one embodiment of the invention, elevator control network node is configured to select an elevator car to serve the elevator call based on the time to reach the elevator location cell, a floor of the elevator location cell, current positions of at least two elevator cars, and current directions of at the least two elevator cars.

In one embodiment of the invention, the selecting of the elevator car to serve the elevator call comprises determining for the at least two elevator cars the time to reach the floor of the elevator location cell based on current positions of at least two elevator cars and current directions of at the least two elevator cars and optionally current speeds of the at least two elevator cars, determining for the at least two elevator cars a time window the elevator car doors may be held open without introducing undue delay for the elevator car, and selecting an elevator car among the at least two elevator cars for which the time window the elevator car doors may be held open fits the time to reach the elevator location cell. For the fitting the time window may be reduced from the time window end time so that, for example, to the time window is not included a short time before the elevator car doors are closed.

In one embodiment of the invention, by elevator car doors may also be meant doors preventing access to an elevator shaft. An elevator car itself may not have doors.

call is used the time to reach a door of the elevator bile node comprises at least one of a handset, a chipset, a mobile device and a mobile terminal.

In one embodiment of the invention, the at least one processor of the apparatus, for example, of the mobile node or the elevator control node may be configured to perform any of the method steps disclosed hereinabove.

In one embodiment of the invention, the mobile node such as a User Equipment (UE) comprises a mobile station or generally a mobile terminal. In one embodiment of the invention a user of a mobile terminal is identified using a subscriber module, for example, User Services Identity Module (USIM) or a Subscriber Identity Module (SIM). The combination of Mobile Equipment (ME) and a subscriber module may be referred to as a mobile subscriber. A mobile subscriber may be identified using an IMSI. An IP address may be allocated or associated with a mobile subscriber.

In one embodiment of the invention, the apparatus is a semiconductor circuit, a chip or a chipset.

In one embodiment of the invention, the mobile node is configured to be used in a 4G system such as, for example, LTE Evolved Packet System (EPS).

In one embodiment of the invention, the computer program is stored on a computer readable medium. The computer readable medium may be, but is not limited to, a removable memory card, a removable memory module, a magnetic disk, an optical disk, a holographic memory or a magnetic tape. A removable memory module may be, for example, a USB memory stick, a PCMCIA card or a smart memory card.

In one embodiment of the invention, an apparatus comprising at least one processor and at least one memory including computer program code, the at least one memory and the computer program code are configured to, with the at least one processor, cause the apparatus at least to perform a method according to any of the method steps.

The embodiments of the invention described hereinbefore may be used in any combination with each other. Several of the embodiments may be combined together to form a further embodiment of the invention. A method, an apparatus, a computer program or a computer program product to which the invention is related may comprise at least one of the embodiments of the invention described hereinbefore.

It is to be understood that any of the above embodiments or modifications can be applied singly or in combination to the respective aspects to which they refer, unless they are explicitly stated as excluding alternatives.

The benefits of the invention are related to improved elevator response time, reduced travel time in elevators and reduced energy consumption of an elevator system.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
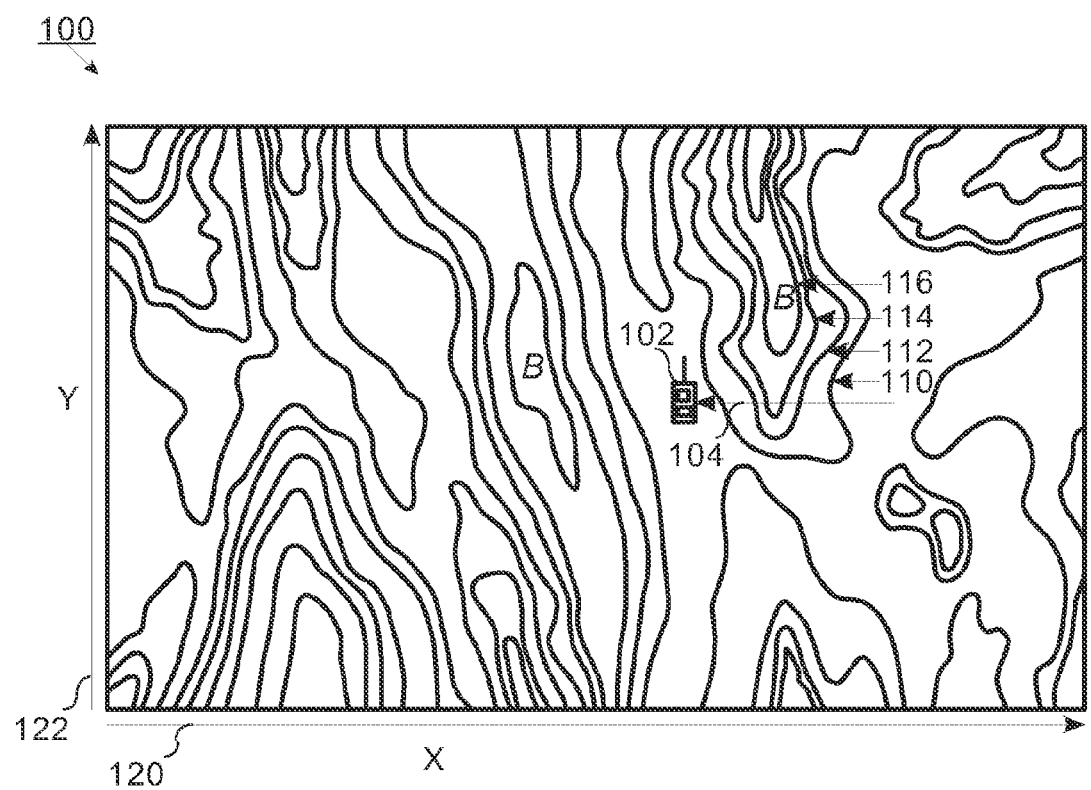
FIG. 1 illustrates a magnetic map of a floor and the movement of a mobile station on the floor in one embodiment of the invention.

FIG. 1 illustrates a magnetic map of a floor and the movement of a mobile station on the floor in one embodiment of the invention. In FIG. 1 there is illustrated a magnetic map 100 of a floor. A position on the floor is expressed in terms of coordinates in an x-axis 120 and in a y-axis 122. The magnetic map reveals magnetic flux density in a number of points on the floor. The magnetic field measured on the floor area is based at least partly on the magnetic field of the Earth. Different structures and objects of the building (not shown) in which the floor is contained affect the magnetic field. Static or Extremely Low-Frequency (ELF) magnetic fields in buildings may arise from both natural and man-made sources, for example, electric power cabling systems, different electric and electronic devices. Steel and reinforced concrete in buildings may cause fluctuations in the ambient magnetic field, which may be reflected on magnetic flux densities recorded on map 100. Some points on the floor may not be accessible for measurement, for example, due to walls, girders, pipelining or electrical lines. In FIG. 1 a map of an entire floor is illustrated for simplicity. Magnetic map 100 is formed, for example, using a separate magnetometer which is further provided with information on current positions of the magnetometer on the floor. The current positions may be obtained using at least one of manual entry, a satellite positioning system, a cellular network geographic positioning system, a near-field receiver or transmitter based positioning system and an accelerometer. Current positions on the floor may be obtained by the magnetometer by utilizing information on at least one predefined known position and information provided to the magnetometer by an associated accelerometer and a gyroscope. The accelerometer and the gyroscope may determine the speed and direction of the motion of the magnetometer. The accelerometer and the gyroscope may be embedded in a single device together with the magnetometer. The single device may be a robot or it may be carried by a human user. The single device may be embedded in a mobile node, for example, a mobile phone or communication device. Magnetic flux density in different points on map 100 is illustrated in FIG. 1 using gradient lines such as gradient lines 110, 112, 114 and 116.

In FIG. 1 it is assumed that a mobile node 102 has access to a memory in which map 100 is stored. Map 100 may be downloaded to mobile node 102. Mobile node 102 moves a path illustrated with arrow 104 on the floor. The mobile node 102 comprises a magnetometer (not shown) which measures magnetic flux density during the moving of the path illustrated with arrow 104. In the path illustrated with arrow 104 the magnetometer provides information to mobile node 102 on the magnetic flux densities encountered. Mobile node 102 may be seen to cross magnetic field gradient lines 110, 112 and 114 while moving the path. The gradient lines represent specific magnetic flux densities measured in, for example, µTesla or Gauss units. Mobile node 102 may determine its position based on a matching of a plurality of magnetic flux densities measured on the path to a plurality of magnetic flux densities on map 100. The matching may utilize speed and direction information provided by a gyroscope and an accelerometer associated with mobile node 102. Mobile node 102 may search for the best matching path from map 100 using the path illustrated with arrow 104 so that the magnetic flux densities measured using magnetometer are within a predefined error from the magnetic flux densities recorded in map 100. The search may utilize information on a previously determined position of mobile node 102. For simplicity of illustration, walls or other obstacles are not shown in FIG. 1.

Figure 2:
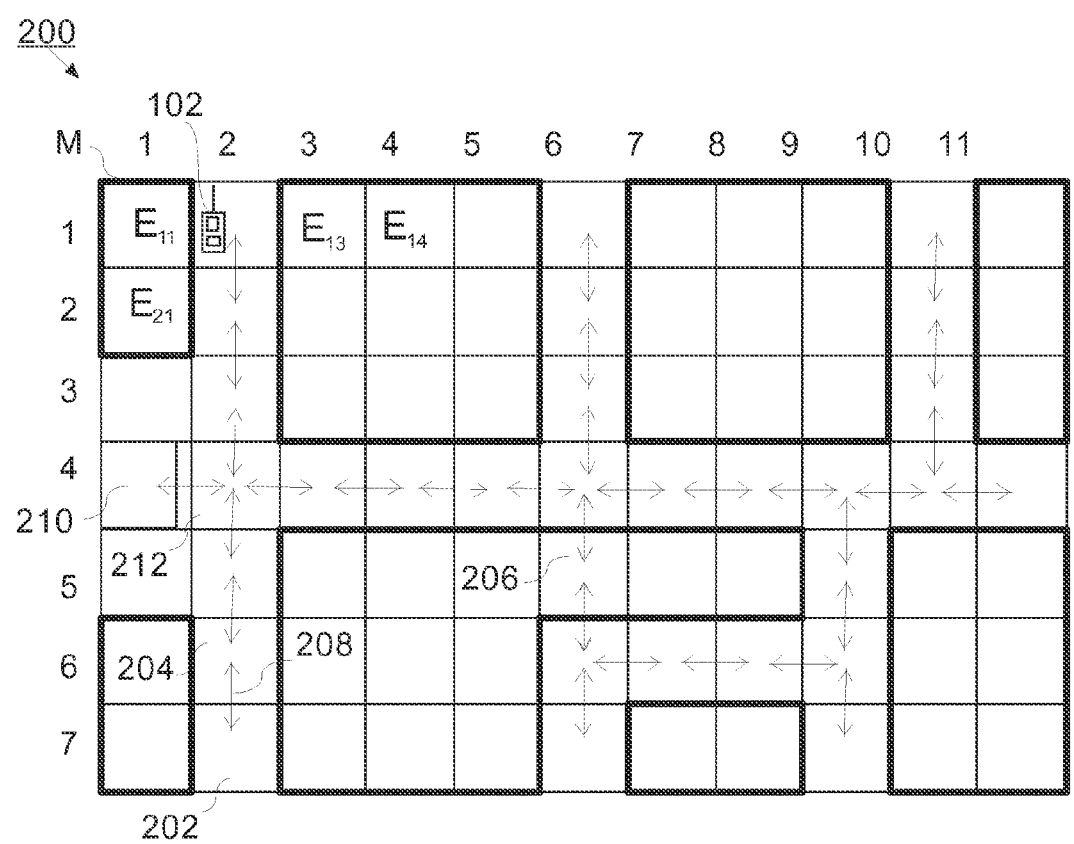
FIG. 2 illustrates a route topology data structure representing a floor in one embodiment of the invention.

FIG. 2 illustrates a route topology data structure representing a floor in one embodiment of the invention. In FIG. 2 there is a route topology data structure 200, in short, a data structure 200. The route in this context refers to human walker, robot or vehicle accessible routes to an area from which elevators may be entered without a significant delay. In FIG. 2 there is also shown mobile node 102, which may be the mobile node illustrated in FIG. 1. In FIG. 2 the route topology data structure is illustrated as a matrix M. A data structure with equivalent function may also be, for example, a sparse matrix or a network of memory records. The matrix has 7 rows and 11 columns illustrating different points on the floor. The matrix represents a division of the floor to a grid. The matrix entries may also be referred to as grid cells, that is, squares on specific rows and columns. The floor may be the floor from which magnetic map 100 is formed in FIG. 1. The normal matrix entry numbering convention is illustrated for entries $E_{11}$, $E_{13}$, $E_{14}$ and $E_{21}$. The matrix comprises entries accessible for an elevator user such as entries 202 and 204. The matrix also comprises entries not accessible for an elevator user such as entry 206. The entry for elevators is entry 210 and the entry for location from which elevators are entered is entry 212. Entry 212 may also be referred to as elevator location cell, that is, grid cell. The matrix entries each comprise information on which neighbor entries are accessible from the entry in question. This is illustrated in FIG. 2 with arrows such as arrow 208. Walls or other obstructions are illustrated with enforced lines. The matrix entries may also comprise information on the estimated walking time from the entry to entry 212 from which elevators are entered. There may be different estimated walking times for different walker speed categories. Walkers may be categorized to a plurality of walker categories. There may be a plurality of elevators.

Initially, the matrix may be empty or have default values or comprise only part of the entries, for example, entry 212 from which elevators are entered, that is, an area in front of a number of elevators. Thereafter, as a plurality of mobile nodes move in the area of the floor, other entries may be recorded in the matrix. The plurality of mobile nodes are provided a predefined spatial size of the entries, that is, the size of a grid in which the floor is divided. The plurality of mobile nodes determine their current positions, that is, the matrix entries based on a magnetic map of the floor, for example, magnetic map 100. Measured walking times from other entries to entry 212 are recorded to the respective entries. Also walking times between neighboring entries or any other two entries may be measured using the plurality of mobile nodes. Similarly, information on the accessibility between entries is recorded in the matrix based on recorded movement of the plurality of mobile nodes. The mobile node measurements regarding walking times between entries and accessibility between entries are provided to a network node in communication with the plurality of network nodes via a plurality of base transceiver stations and a network. The base transceiver stations may be Wireless Local Area Network (WLAN) base transceiver stations or cellular base transceiver stations. The network may be a mobile communication system such as the Universal Mobile Telecommunication System (UMTS), Global System of Mobile communications (GSM) or Long-Term Evolution (LTE) or other similar network. The network may comprise a packet switched or a circuit switched network.

The matrix may be regularly traversed by the network node starting, for example, from entry 212 to calculate cumulative walking times to entry 212 from any entries accessible from entry 212. Some mobile nodes may have traversed a path of entries that does not reach entry 212, but that crosses another path reaching entry 212. Information on connections between entries that have not been used within a predefined period of time may be removed from the affected entries. Therefore, in case a new wall or other obstruction is installed to the floor, the path via wall may be removed from the matrix. This is illustrated with faded lines in entry 206.

In one embodiment of the invention, there is more than one matrix entry, that is, grid cell from which elevators are directly accessible, that is, without a significant walking time. There may be a long row of elevators. The area in front of the row of elevators may be divided in two or more elevator location cells, that is, matrix entries. In the matrix entries may be stored information on the route to the closest matrix entry from which elevators may be entered. In the matrix entries may be stored information on the route to the all matrix entries from which elevators may be entered. The route information comprises the walking time. In one embodiment of the invention, in a selection of the elevator cage to serve the elevator call is used the time to reach a door of the elevator cage from the elevator location cell. The elevator cage may also be referred to as elevator car. This may be necessary, if the walking time from the closest matrix entry to the elevator door exceeds a time proportional to the minimum time the elevator doors are kept open.

The embodiments of the invention described hereinbefore in association with FIGS. 1 and 2 may be used in any combination with each other. Several of the embodiments may be combined together to form a further embodiment of the invention.

Figure 3:
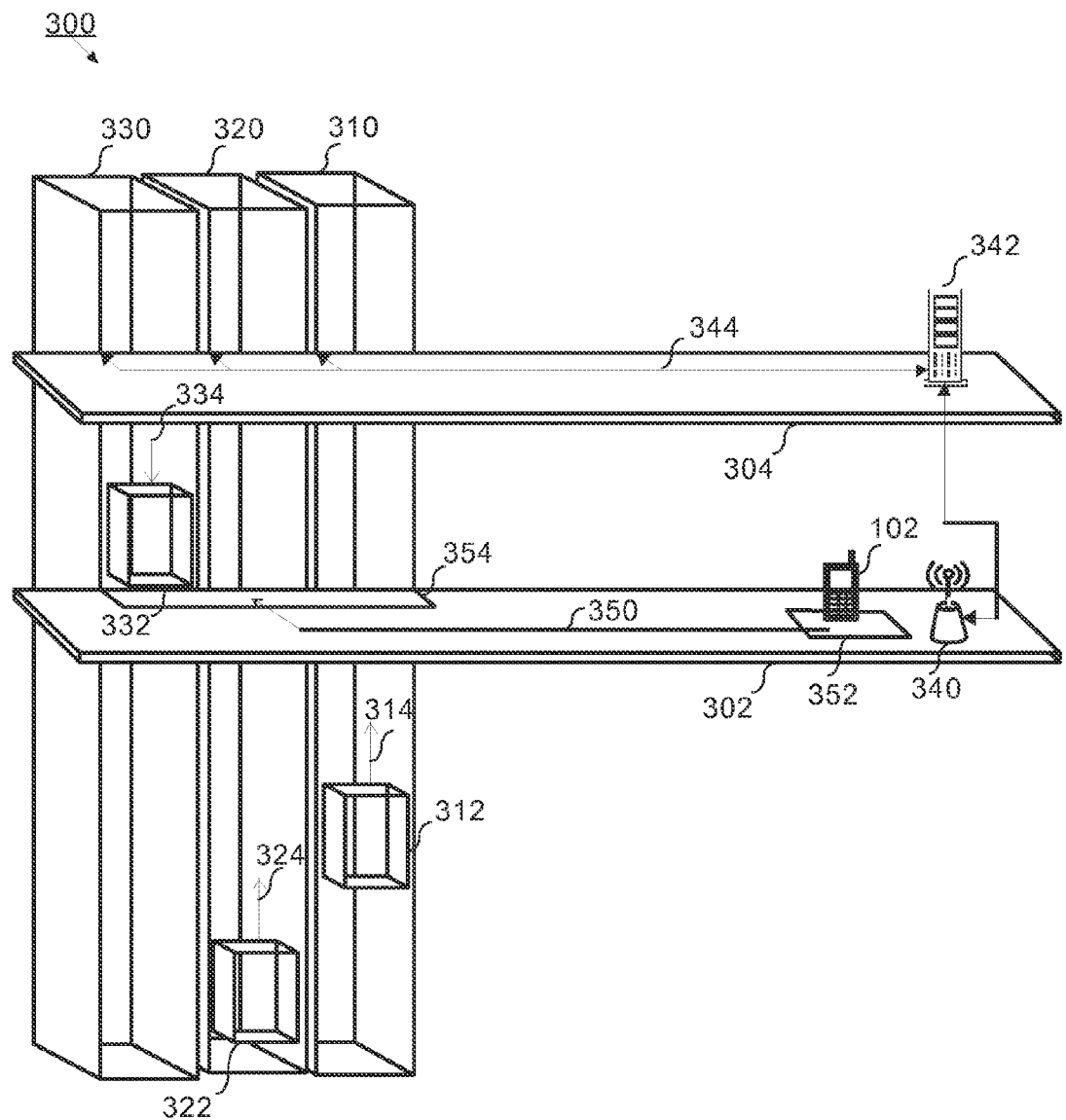
FIG. 3 illustrates two floors, three elevator shafts and elevator cages and an elevator selection system comprising a mobile node in one embodiment of the invention.

FIG. 3 illustrates two floors, namely floors 302 and 304, three elevator shafts, namely elevator shafts 310, 320 and 330, and three elevator cages and an elevator system in one embodiment of the invention. The number of elevators and floors is just for illustrative purposes and may vary in different embodiments. The figure may not be in scale with actual implementations. In FIG. 3 there is illustrated also an elevator system 300. System 300 comprises elevator cages 312, 322 and 332. The system 300 comprises also a network node 342, for example, a network server. Network node 342 is communicatively connected to elevator cages 312, 322 and 332 as illustrated with arrow 344. In a memory of network node 342 there is maintained information on the current vertical positions on elevator cages 312, 322 and 332, for example, at a granularity of floor or at a higher granularity. In the memory of network node 342 there may also be maintained information on the speeds 314, 324, 334 and current directions of elevator cages 312, 322 and 332, respectively. Network node 342 is also communicatively connected to a base station 340, which may be, for example, a cellular system base station or a WLAN access point. In FIG. 3 base station 340 is illustrated on a floor, but it may be located also outside. Base station 340 is communicatively connected to mobile node 102, which may be a cellular phone or a personal communicator, for example, a UMTS or LTE User Equipment (UE), or a GSM Mobile Station (MS). Mobile node 102 may be any portable electronic device.

The starting point in FIG. 3 is that mobile node 102 has obtained a magnetic map, for example, magnetic map 100 from network node 342. Mobile node 102 also has obtained from network node 342 a route topology data structure, for example, data structure 200 which may be used by mobile node 102 to estimate the walking time to an area 354 in front of elevators based on a current position of mobile node 102. Area 354 may be referred to as an elevator location cell or matrix entry from which elevators may be entered. The current position of mobile node 102 within floor 302 is determined using the magnetic map. In one embodiment of the invention, the route topology data structure is not sent to mobile node 102, but mobile node 102 only sends information at the detection of an elevator call on the current position of mobile node 102 to network node 342.

When mobile node 102 reaches an area 352 an elevator call is made. The elevator call comprises information that the destination floor for the elevator travel is floor 304. The elevator call may be made by the user using a user interface of mobile node 102 or automatically when reaching area 352, which may be used as a criterion for determining that with a probability exceeding a predefined threshold the user of mobile node 102 make an elevator travel from floor 302 to floor 304. The current time of the day may be used as an additional criterion for making the elevator call automatically by mobile node 102. When the elevator call has been made, mobile node determines the estimated walking time to reach area 354 from area 352 using the route topology data structure. The route is illustrated with arrow 350. Possible obstacles that cause a rectangular shape for the route are not shown in FIG. 3. Mobile node 102 sends the estimated walking time to network node 342 via base station 340. Upon receiving the estimated walking time, network node 342 may check the elevator cage positions and directions. Network node 342 may also check elevator cage speeds and the floors in which the elevator cages are scheduled to stop. Network node 342 may compare the estimated walking time to the estimated times for each elevator cage to reach floor 302, taking into consideration the current scheduled stops, directions and speeds of the elevator cages. Network node 342 selects the best matching elevator cage. In FIG. 3 elevator cage 324 may be selected because it is closest to floor 302 when the user of mobile node 102 reaches area 354. Elevator cage 312 may not be selected as it is assumed to arrive too soon at floor 302, which may cause undesired waiting for passengers currently in elevator cage 312 or passengers waiting in other floors in which cage 312 is scheduled to stop. When the user of mobile node 102 is detected to enter elevator cage 324 and if there are no users for which elevator cage 324 has been selected, the elevator doors may be closed immediately. The user of mobile node 102 being in cage 324 may be detected using at least one of a near-field transmitter in cage 324 read by mobile node 102, mobile node 102 indicating the current position of mobile node 102 based on magnetic map to network node 342 and an elevator cage scale in cage 324.

The embodiments of the invention described hereinbefore in association with FIGS. 1, 2 and 3 may be used in any combination with each other. Several of the embodiments may be combined together to form a further embodiment of the invention.

Figure 4:
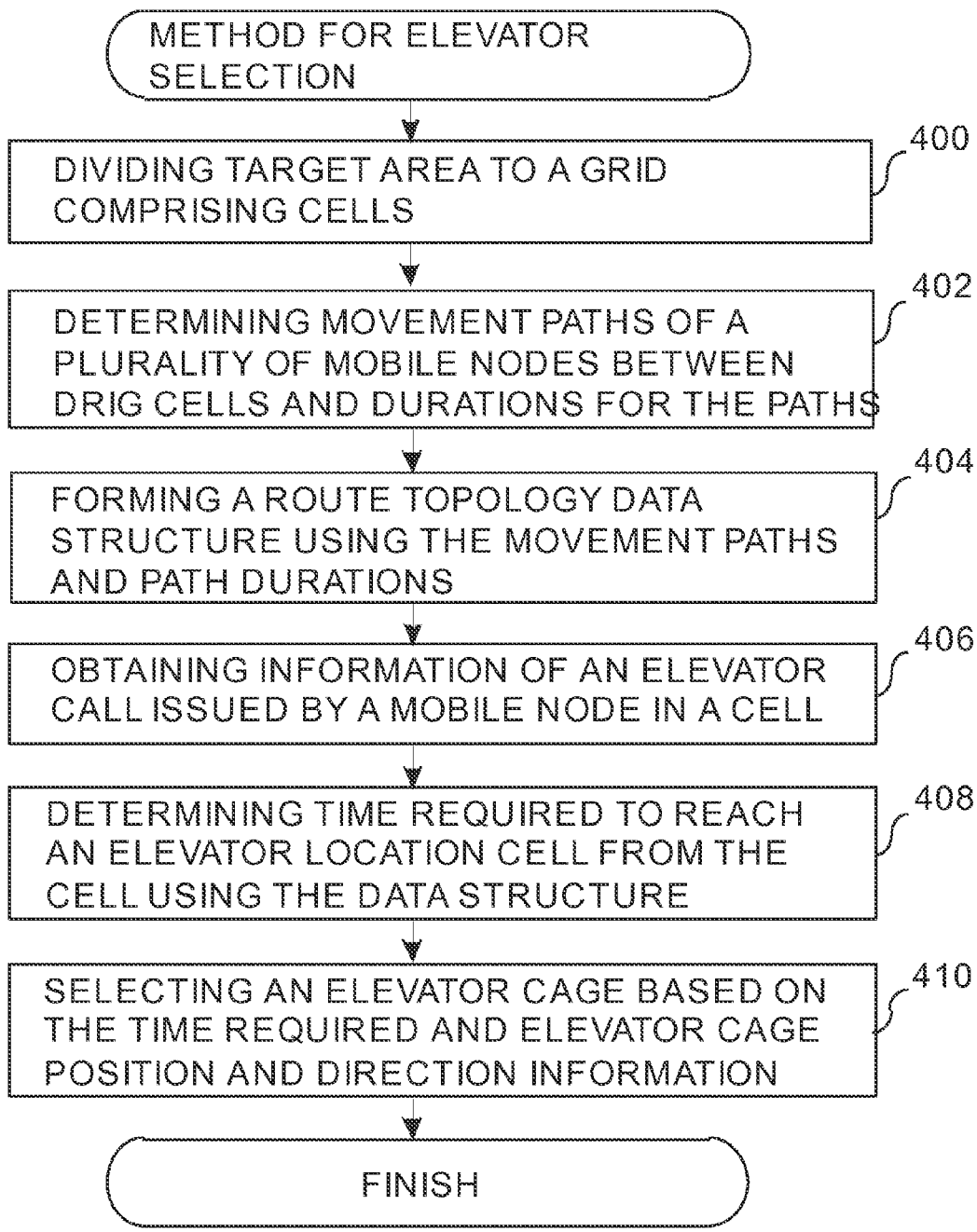
FIG. 4 is a flow chart illustrating a method for elevator selection in one embodiment of the invention.

FIG. 4 is a flow chart illustrating a method for elevator selection in one embodiment of the invention.
in FIG. 3. Mobile node 102 sends the estimated walk-floor of a building is divided to a grid having a predefined resolution, the grid comprising a plurality of cells. The resolution, that is, the grid cell sizes, is defined in meters or centimeters.

At step 402 a plurality of movement paths of a plurality of mobile nodes are determined, each movement path comprising an origin cell and a target cell, the origin cell and the target cell being determined using a magnetic map of the target area. The durations of the plurality of movement paths are determined for an elevator user. Durations may be determined for a different walker speed categories or for individual walkers that are identified using a mobile node identifier. The determination of the durations of the plurality movement paths may be performed during the determination of the movement paths. Information on the movement paths and durations may be sent to a route network node. The plurality of the mobile nodes may store the magnetic map in their memories.

At step 404 is formed a route topology data structure using the plurality of movement paths and the durations of the plurality of movement paths for an elevator user, the route topology data structure comprising for a plurality of cells a time to reach an elevator location cell. The route topology data structure may be distributed by the route network node to a plurality of mobile nodes.

In one embodiment of the invention, the route topology data structure may comprise information on movement paths and path durations to multiple elevator location cells. A closest elevator location cell may be selected for determining a walking distance to elevators. This walking distance is then used for the selection of the elevator cage. The selection may be performed by the route network node or by a requesting mobile node.

At step 406 is obtain information on an elevator call made by the requesting mobile node in a request cell, that is, the cell in which the elevator call is made. The information on the elevator call and the request cell may be provided to the route network node.

At step 408 is determined the time to reach the elevator location cell using the route topology data structure and information on the request cell. The information on the elevator call, the request cell or the time to reach the elevator location cell may be provided to an elevator control network node.

At step 410 is selected an elevator cage to serve the elevator call based on the time to reach the elevator location cell, a floor of the elevator location cell, current positions of at least two elevator cages, and current directions of at the least two elevator cages. The selection may be performed in the elevator control network node.

In one embodiment of the invention, the steps may be performed in the order of numbering.

In one embodiment of the invention, the route network node and the elevator control network node are the same network node. They may be different logical network nodes within a single computer.

Figure 5:
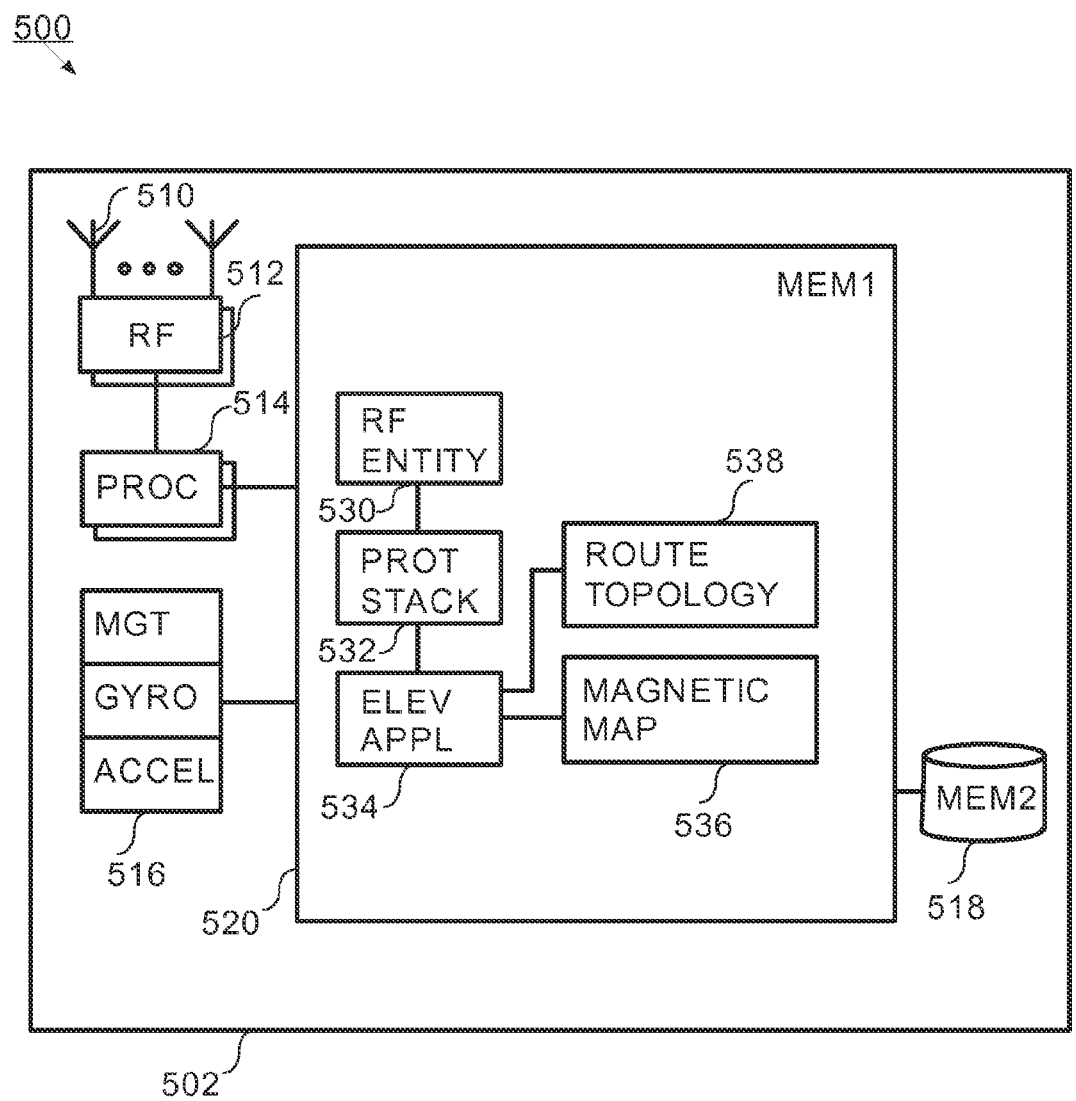
FIG. 5 is a block diagram illustrating a mobile node in one embodiment of the invention.

FIG. 5 is a block diagram illustrating an apparatus in one embodiment of the invention. In FIG. 5 there is an apparatus 500, which is, for example, a mobile node, a cellular system user equipment such as UMTS or LTE UE, a cellular system mobile station, an Application Specific Integrated Circuit (ASIC), a chip or a chipset. Apparatus 500 may correspond to a mobile node illustrated in FIGS. 1, 2 and 3. The internal functions of apparatus 500 are illustrated with a box 502. Apparatus 500 may comprise at least one antenna 510. There may be multiple input and output antennas. In association with apparatus 500 there is at least one Radio Frequency (RF) circuit 512. RF circuit 512 may be also any circuit or may be referred to as circuit 512 or circuitry 512. RF circuit 512 may also comprise a baseband circuit. RF circuit 512 is communicatively connected to at least one processor 514. Connected to the at least one processor 514 there may be a first memory 520, which is, for example, a Random Access Memory (RAM). There may also be a second memory 518, which may be a non-volatile memory, for example, an optical or magnetic disk or a solid state disk. There is also a position and speed determination chip or circuit 516. Circuit 516 comprises a magnetometer, a gyroscope and an accelerometer. In memory 520 there may be stored software relating to functional entities 532, 534 and 536.

A protocol stack entity 532 communicates via an RF entity 530 with the at least one RF circuit 514 to perform signaling towards a base station and user data transmission and reception to/from the base station. An elevator application 534 obtains position and speed data of apparatus 500 from circuit 516. Elevator application 534 may store route topology data structure 538 in memory 520 formed using position and speed and direction information determined by elevator application 534 using circuit 516. Elevator application 534 accesses information on magnetic map 536 stored in memory 520. Elevator application may transmit elevator calls to a remote network node via protocol stack entity 532. Elevator application 534 may determine a plurality of movement paths of a plurality of mobile nodes, each movement path comprising an origin cell and a target cell, the origin cell and the target cell being determined using a magnetic map of the target area. Elevator application 534 may determine the durations of the plurality of movement paths for an elevator user. Elevator application 534 may determine an elevator call in a request cell by a requesting mobile node, the request cell being the cell in which the elevator call is made. The elevator call may be determined by the user giving the call via a user interface of apparatus 500, for example, via a touchscreen or a keypad. The elevator call may be determined by elevator application 534 automatically, for example, when the user is in a predetermined position determined using the magnetic map.

RF circuit 512 may comprise a transmitter for SC-FDMA and a receiver and a transmitter for OFDMA. RF circuit 512 may also comprise a receiver for SC-FDMA. RF circuit 512 may also comprise a transmitter and a receiver circuit for WLAN transmission or reception. As used in this application, the term 'circuitry' and 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device When the at least one processor 514 executes functional entities associated with the invention, memory 520 comprises entities such as, any of the functional entities 532, 534 and 536.

Figure 6:
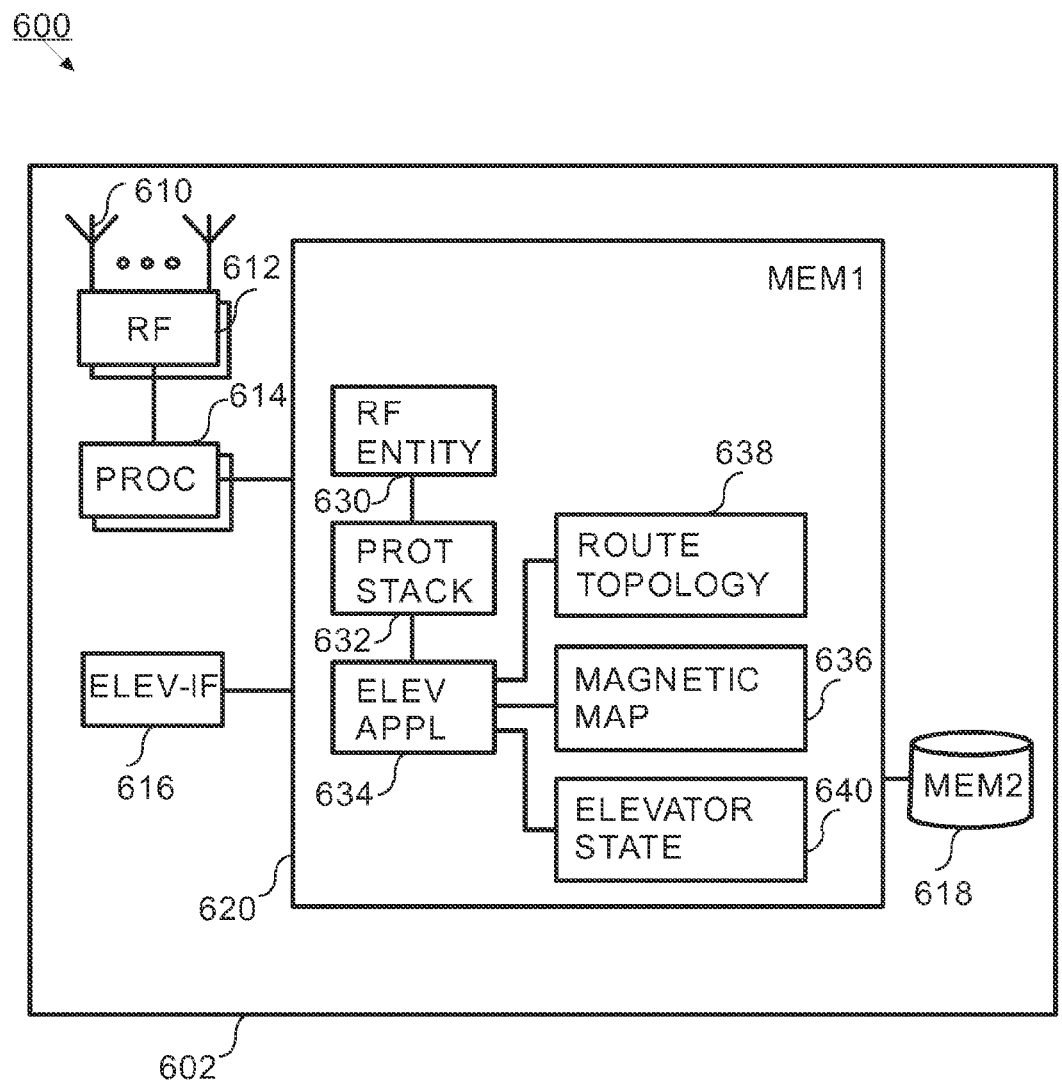
FIG. 6 is a block diagram illustrating a network node in one embodiment of the invention.

FIG. 6 is a block diagram illustrating a network node in one embodiment of the invention. In FIG. 6 there is an apparatus 600, which is, for example, a network node, a computer, a server computer, an Application Specific Integrated Circuit (ASIC), a chip or a chipset. Apparatus 600 may correspond to a network node illustrated in FIG. 3. The internal functions of apparatus 600 are illustrated with a box 602. Apparatus 600 may comprise at least one antenna 610. There may be multiple input and output antennas. In association with apparatus 600 there is at least one Radio Frequency (RF) circuit 612. RF circuit 612 may be also any circuit or may be referred to as circuit 612 or circuitry 612. RF circuit 612 may also comprise a baseband circuit. RF circuit 612 is communicatively connected to at least one processor 614. Connected to the at least one processor 614 there may be a first memory 620, which is, for example, a Random Access Memory (RAM). There may also be a second memory 618, which may be a non-volatile memory, for example, an optical or magnetic disk or a solid state disk. There an elevator interface circuit 516 for obtaining information from at least one elevator cage. In memory 620 there may be stored software relating to functional entities 632, 634 and 636.

A protocol stack entity 632 communicates via an RF entity 630 with the at least one RE circuit 614 to perform signaling towards a base station and user data transmission and reception to/from the base station. An elevator application 634 obtains position and speed data of apparatus 600 from elevator interface circuit 616. Elevator application 634 may store route topology data structure 638 in memory 520 formed using movement path and path duration information received from a plurality of mobile nodes. The route topology data structure is formed using the plurality of movement paths and the durations of the plurality of movement paths, the route topology data structure comprising for a plurality of cells an estimated time to reach an elevator location. Elevator application 634 may store a magnetic map 636 stored in memory 620. The magnetic map may be distributed to a plurality of mobile nodes by elevator application 634. Elevator application 634 may receive elevator calls from mobile nodes via protocol stack entity 632. Elevator application 634 may perform the selection of elevator cages to serve elevator calls. Elevator application 634 may issue floor visit instructions to the at least one elevator cage via elevator interface circuit 616.

RF circuit 612 may comprise a transmitter for SC-FDMA and a receiver and a transmitter for OFDMA. RF circuit 612 may also comprise a receiver for SC-FDMA. RF circuit 612 may also comprise a transmitter and a receiver circuit for WLAN transmission or reception. As used in this application, the term 'circuitry' and 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device When the at least one processor 614 executes functional entities associated with the invention, memory 620 comprises entities such as, any of the functional entities 632, 634 and 636.

The functional entities within apparatus 500 illustrated in FIG. 5 and the functional entities within apparatus 600 illustrated in FIG. 6 may be implemented in a variety of ways. They may be implemented as processes executed under the native operating system of the network node. The entities may be implemented as separate processes or threads or so that a number of different entities are implemented by means of one process or thread. A process or a thread may be the instance of a program block comprising a number of routines, that is, for example, procedures and functions. The functional entities may be implemented as separate computer programs or as a single computer program comprising several routines or functions implementing the entities. The program blocks are stored on at least one computer readable medium such as, for example, a memory circuit, memory card, magnetic or optical disk. Some functional entities may be implemented as program modules linked to another functional entity. The functional entities in FIG. 4 may also be stored in separate memories and executed by separate processors, which communicate, for example, via a message bus or an internal network within the network node. An example of such a message bus is the Peripheral Component Interconnect (PCI) bus.

The embodiments of the invention described hereinbefore in association with FIGS. 1, 2, 3, 4, 5 and 6 or the summary of the invention may be used in any combination with each other. Several of the embodiments may be combined together to form a further embodiment of the invention.

The exemplary embodiments of the invention can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (for instance, voice, modem, and the like), wireless communications media, one or more wireless communications networks, cellular communications networks, 3G communications networks, 4G communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices, or one or more software entities such as modules.

The exemplary embodiments can store information relating to various processes described herein. This information can be stored in one or more memories, such as a hard disk, optical disk, magneto-optical disk, RAM, and the like. One or more databases can store the information regarding cyclic prefixes used and the delay spreads measured. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of one or more application-specific integrated circuits or by interconnecting an appropriate network of conventional component circuits, as will be appreciated by those skilled in the electrical art(s).

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

The embodiments of the invention described hereinbefore in association with the figures presented and the summary of the invention may be used in any combination with each other. Several of the embodiments may be combined together to form a further embodiment of the invention.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:
1. A method, comprising:
dividing a target area to grid having a predefined resolution, the grid comprising a plurality of cells;
determining a plurality of movement paths of a plurality of mobile nodes, each movement path comprising an origin cell and a target cell, the origin cell and the target cell being determined using a magnetic map of the target area;
determining durations of the plurality of movement paths for an elevator user;
forming a route topology data structure using the plurality of movement paths and the durations of the plurality of movement paths, the route topology data structure comprising for the plurality of cells a time to reach an elevator location cell;
determining an elevator call in a request cell by a requesting mobile node, the request cell being the cell in which the elevator call is made;
determining the time to reach the elevator location cell using the route topology data structure and information on the request cell; and
selecting an elevator car to serve the elevator call based on the time to reach the elevator location cell, a floor of the elevator location cell, current positions of at least two elevator cars, and current directions of at the least two elevator cars.

2. The method according to claim 1, the method further comprising:
measuring the magnetic map of the target area using a magnetometer; and
storing the magnetic map to a memory.

3. The method according to claim 2, wherein the step of storing the magnetic map to the memory comprises:
transmitting a plurality of magnetic map measurements of the target area to a magnetic map network server; and
storing the magnetic map to a memory within the magnetic map network server.

4. The method according to claim 1, the method further comprising:
determining actual time required for the requesting mobile node to reach the elevator location cell; and
updating the data related to at least the request cell in the route topology data structure using the actual time.

5. The method according to claim 1, the method further comprising:
associating a mobile node identifier for each of the plurality of movement paths;
determining a speed category for each mobile node; and
storing in the route topology data structure a time to reach an elevator location cell for each speed category.

6. The method according to claim 4, wherein the step of determining the time to reach the elevator location cell comprises:
determining a speed category of the mobile node.

7. The method according to claim 1, wherein the elevator call comprises information on the target floor and the selecting of the elevator car to serve the elevator call uses the target floor as a further criterion.

8. The method according to claim 7, the method further comprising:
transmitting information on the magnetic map to the plurality of mobile nodes.

9. The method according to claim 1, wherein the step of forming the route topology data structure comprises:
receiving information on the plurality of movement paths and movement path durations from the plurality of mobile nodes to a route network server; and
forming the route topology data structure in the route network server.

10. The method according to claim 9, wherein the method further comprises:
receiving the elevator call from the requesting mobile node by the route network server, the route network server determining the time to reach the elevator location cell using the route topology data structure and the request cell and the route network server selecting the elevator car to serve the elevator call.

11. The method according to claim 1, the method further comprising:
transmitting a request to a controller associated with the selected elevator car, the request indicating the floor the elevator call was made in.

12. The method according to claim 1, the method further comprising:
indicating the selected elevator car to the user of the mobile node.

13. The method according to claim 12, wherein the selected elevator car is indicated to the user of the mobile node using a display of the mobile node.

14. The method according to claim 12, wherein the selected elevator car is indicated to the user of the mobile node using an external display within a predefined proximity from the mobile node.

15. The method according to claim 1, wherein the time to reach a door of the elevator car from the elevator location cell is used in the selection of the elevator car to serve the elevator call.

16. A method, comprising:
dividing a target area to grid having a predefined resolution, the grid comprising a plurality of cells by a mobile node;
determining a first cell by the mobile node using a magnetic map in the mobile node;
determining a second cell by the mobile node using the magnetic map in the mobile node;
determining the time elapsed to move between the first cell and the second cell;
transmitting information on the first cell, the second cell and the time elapsed to a route topology network node;
receiving a route topology data structure by the mobile node from the route topology network node, the route topology data structure comprising for a plurality of cells a time to reach an elevator location cell;
determining an elevator call by the mobile node;
determining a request cell in which the elevator call is made using the magnetic map in the mobile node;
determining the time to reach the elevator location cell using the route topology data structure and information on the request cell; and
transmitting the time to reach the elevator location cell to an elevator control network node.

17. An apparatus comprising at least one processor and at least one memory including computer program code, the at least one memory and the computer program code configured to, with the at least one processor, cause the apparatus at least to perform:
dividing a target area to grid having a predefined resolution, the grid comprising a plurality of cells;
receiving information on a plurality of movement paths of a plurality of mobile nodes, each movement path comprising an origin cell and a target cell, the origin cell and the target cell being determined using a magnetic map of the target area;

determining the durations of the plurality of movement paths;

forming a route topology data structure using the plurality of movement paths and the durations of the plurality of movement paths, the route topology data structure comprising for a plurality of cells a time to reach an elevator location cell;

receiving information on an elevator call in a request cell by a requesting mobile node, the request cell being the cell in which the elevator call is made;

determining the time to reach the elevator location cell using the route topology data structure and the request cell; and selecting an elevator car to serve the elevator call based on the time to reach the elevator location cell, a floor of the elevator location cell, current positions of at least two elevator cars, and current directions of the at least two elevator cars.

18. An apparatus comprising at least one processor and at least one memory including computer program code, the at least one memory and the computer program code configured to, with the at least one processor, cause the apparatus at least to perform:

dividing a target area to grid having a predefined resolution, the grid comprising a plurality of cells by a mobile node;

determining a first cell by the mobile node using a magnetic map in the mobile node;

determining a second cell by the mobile node using the magnetic map in the mobile node;

determining the time elapsed to move between the first cell and the second cell;

transmitting information on the first cell, the second cell and the time elapsed to a route topology network node;

receiving a route topology data structure by the mobile node from the route topology network node, the route topology data structure comprising for a plurality of cells a time to reach an elevator location cell;

determining an elevator call by the mobile node;

determining a request cell in which the elevator call is made using the magnetic map in the mobile node;

determining the time to reach the elevator location cell using the route topology data structure and information on the request cell; and transmitting the time to reach the elevator location cell to an elevator control network node.

19. A computer program comprising code adapted to cause the following when executed on a data-processing system:

dividing a target area to grid having a predefined resolution, the grid comprising a plurality of cells;

determining a plurality of movement paths of a plurality of mobile nodes, each movement path comprising an origin cell and a target cell, the origin cell and the target cell being determined using a magnetic map of the target area;

determining the durations of the plurality of movement paths;

forming a route topology data structure using the plurality of movement paths and the durations of the plurality of movement paths, the route topology data structure comprising for a plurality of cells a time to reach an elevator location cell;

determining an elevator call in a request cell by a requesting mobile node, the request cell being the cell in which the elevator call is made;

determining the time to reach the elevator location cell using the route topology data structure and the request cell; and selecting an elevator car to serve the elevator call based on the time to reach the elevator location cell, a floor of the elevator location cell, current positions of at least two elevator cars, and current directions of the at least two elevator cars.

20. The computer program according to claim 19, wherein said computer program is stored on a computer readable medium.

21. A computer program comprising code adapted to cause the following when executed on a data-processing system:

dividing a target area to grid having a predefined resolution, the grid comprising a plurality of cells by a mobile node;

determining a first cell by the mobile node using a magnetic map in the mobile node;

determining a second cell by the mobile node using the magnetic map in the mobile node;

determining the time elapsed to move between the first cell and the second cell;

transmitting information on the first cell, the second cell and the time elapsed to a route topology network node;

receiving a route topology data structure by the mobile node from the route topology network node, the route topology data structure comprising for a plurality of cells a time to reach an elevator location cell;

determining an elevator call by the mobile node;

determining a request cell in which the elevator call is made using the magnetic map in the mobile node;

determining the time to reach the elevator location cell using the route topology data structure and information on the request cell; and transmitting the time to reach the elevator location cell to an elevator control network node.

22. The computer program according to claim 21, wherein said computer program is stored on a computer readable medium.

\* \* \* \* \*